(12) United States Patent
Boussaad et al.

(10) Patent No.: US 7,947,371 B2
(45) Date of Patent: May 24, 2011

(54) SINGLE-WALLED CARBON NANOTUBE COMPOSITES

(75) Inventors: Salah Boussaad, Wilmington, DE (US); Mark Andrew Harmer, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/261,810

(22) Filed: Oct. 28, 2005

(65) Prior Publication Data

US 2006/0240238 A1    Oct. 26, 2006

Related U.S. Application Data

(60) Provisional application No. 60/625,625, filed on Nov. 5, 2004.

(51) Int. Cl.
*B32B 9/00* (2006.01)
(52) U.S. Cl. .................................. 428/408; 977/742
(58) Field of Classification Search ................ 428/408, 428/698; 977/742; 423/447.1, 447.3
See application file for complete search history.

(56) References Cited

U.S. PATENT DOCUMENTS

| | | | | |
|---|---|---|---|---|
| 6,420,293 B1 * | 7/2002 | Chang et al. | ................. | 501/95.2 |
| 6,749,712 B2 * | 6/2004 | Kuper | ........................... | 156/296 |
| 7,008,563 B2 * | 3/2006 | Smalley et al. | ............... | 252/511 |
| 2003/0173884 A1 * | 9/2003 | Heo et al. | ................. | 313/103 R |
| 2004/0025732 A1 | 2/2004 | Tuck et al. | | |
| 2004/0132072 A1 | 7/2004 | Zheng et al. | | |

FOREIGN PATENT DOCUMENTS

WO     WO 2004/048256 A2    6/2004

OTHER PUBLICATIONS

Guo, Immobilization and Visualization of DNA and Proteins on Carbon Nanotubes, Adv. Mater. 1998, 10, No. 9 (p. 701-703).*
O'Connell, Reversible water-solubilization of single walled carbon nanotubes by polymer wrapping, Chemical Physics Letters 342 (2001) p. 265-271.*
Buzaneva et al (Mat. Sci. Eng. C, Jan. 2002, 19:41-45).*
Yerushalmirozen et al (WO 02/076888, filed Mar. 25, 2002).*
J. Dimaio et al., Transparent Silica Glasses Containing Single Walled Carbon Nanotubes, Inorganic Optical Materials III, Proceedings of SPIE, vol. 4452:48-53, 2001.
Jinwei Ning et al., Surfactants Assisted Processing of Carbon Nanotube-Reinforced SIO2 Matrix Composites, Ceramics International, vol. 30:63-67, 2004.
Qiang Fu et al., Selective Coating of Single Wall Carbon Nanotubes With Thin SIO2 Layer, Nano Letters, vol. 2(4):329-332, 2002.
Winny Dong et al., Electrochemical Properties of Vanadium Oxide Aerogels, Science and Technology of Advanced Materials, vol. 4:3-11, 2003.
J. S. Sakamoto et al., Vanadium Oxide-Carbon Nanotube Composite Electrodes for Use in Secondary Lithium Batteries. Journal of the Electrochemical Society, vol. 149(1):A26-A30, 2002.
P. Vincent et al., Inclusion of Carbon Nanotubes in a TIO2 Sol-Gel Matrix, Journal of Non-Crystalline Solids, vol. 311:130-137, 2002.

(Continued)

*Primary Examiner* — Angela Ortiz
*Assistant Examiner* — Daniel Miller

(57) ABSTRACT

Metal oxide composites containing highly dispersed single-walled carbon nanotubes were prepared using sol-gel methods and shown to be electrically conducting.

18 Claims, 3 Drawing Sheets

OTHER PUBLICATIONS

Vaisman et al., Adv. Colloid Interface Sci. 128-130:37-46 (2006).
Song & Youn, Carbon 43:1378-85 (2005).
Xie et al., Mater. Sci. Eng. R Rep. 49:89-112 (2005).
Nakashima, Int. J. Nanosci. 4:119-37 (2005).
Sanchez et al., C. R. Chimie 6:1131-51 (2003).
Schmidt, J. Non-Crystalline Solids 73:681-91 (1985).
Schmidt, J. Sol-Gel Sci. Technol. 40:115-30 (2006).

* cited by examiner

SINGLE-WALLED CARBON NANOTUBE COMPOSITES

CROSS REFERENCE TO RELATED APPLICATION

This application claims priority from Provisional U.S. Patent Application Ser. No. 60/625,625, filed Nov. 5, 2004, which is incorporates by reference herein in its entirety.

FIELD OF INVENTION

The invention is directed to a metal oxide composite containing single-walled carbon nanotubes.

BACKGROUND

Carbon nanotubes (CNT) have been the subject of intense research since their discovery in 1991. CNTs possess unique properties such as small size, considerable stiffness, and electrical conductivity, which makes them suitable for a wide range of applications, including use as nanocomposites, molecular electronics, and field emission displays. Carbon nanotubes may be either multi-walled (MWNTs) or single-walled (SWNTs), and have diameters on the nanometer scale.

Depending on their atomic structure CNTs may have either metallic or semiconducting properties. These properties, in combination with their small dimensions, make CNTs particularly attractive for use in the fabrication of nano-devices. A major obstacle to such efforts has been the difficulty manipulating the nanotubes. Aggregation is particularly problematic because the highly polarized, smooth-sided fullerene tubes readily form parallel bundles or ropes with a large van der Waals binding energy. This bundling perturbs the electronic structure of the tubes, and it confounds all attempts to separate the tubes by size or type or to use them as individual macromolecular species. Various methods have been used to disperse carbon nanotubes. For example, commonly owned U.S. Patent Appl. 20040132072 and WO 2004/048256, teach that nucleic acid molecules are able to singly disperse high concentrations of bundled carbon nanotubes in an aqueous solution.

Sol-gel techniques to prepare inorganic, crystalline materials, especially metal oxides, are very well-known in the art. Dispersing carbon nanotubes in such a matrix can produce materials with many valuable properties, such as enhanced conductivity and improved strength.

Vincent, P. et al., (J. of Non-Crystalline Solids 311 (2002), pg. 130-137) and Ning, J., et al., (Ceramics Internat. 30 (2004) pg. 63-67) both prepared composites of multi-walled CNTs in a metal oxide sol-gel matrix. However, although multiwalled CNTs are easier to manipulate than single-walled CNTs, homogenous dispersion was not achieved.

Dong, W., et al., (Science and Tech, of Adv. Materials 4 (2003), pg. 3-11) prepared vanadium oxide aerogels using suspensions of SWNT's, however significant agglomeration was seen.

There is a need therefore for conductive materials comprising single walled carbon nanotubes for use in nanodevices. Applicants have met that need through the discovery that inorganic metal oxides can be formed containing a highly dispersed network of single walled carbon nanotubes, producing novel materials with unique properties.

SUMMARY OF THE INVENTION

The invention is directed to a single walled carbon nanotube composition comprising a population of highly dispersed single walled carbon nanotubes in an inorganic matrix. The inorganic matrix can be a metal oxide, and can be prepared using sol-gel methods. The single walled carbon nanotubes can be associated with a dispersant.

The invention is also directed to a coated article comprising a substrate comprising the present invention coated on said substrate, and a shaped article comprising the composition.

The invention is also directed to a method for the production of a single walled carbon nanotube containing composition comprising the steps of: a) providing a population of highly dispersed single walled carbon nanotubes in solution comprising a solvent; b) mixing the solution of a) with a metal oxide precursor system to form a reaction mixture; c) allowing the reaction mixture of b) to form a metal oxide network; d) removing any residual solvent from the metal oxide network to form a dried metal oxide network; and e) optionally washing the dried metal oxide network.

DETAILED DESCRIPTION OF THE INVENTION

Figure 1A:
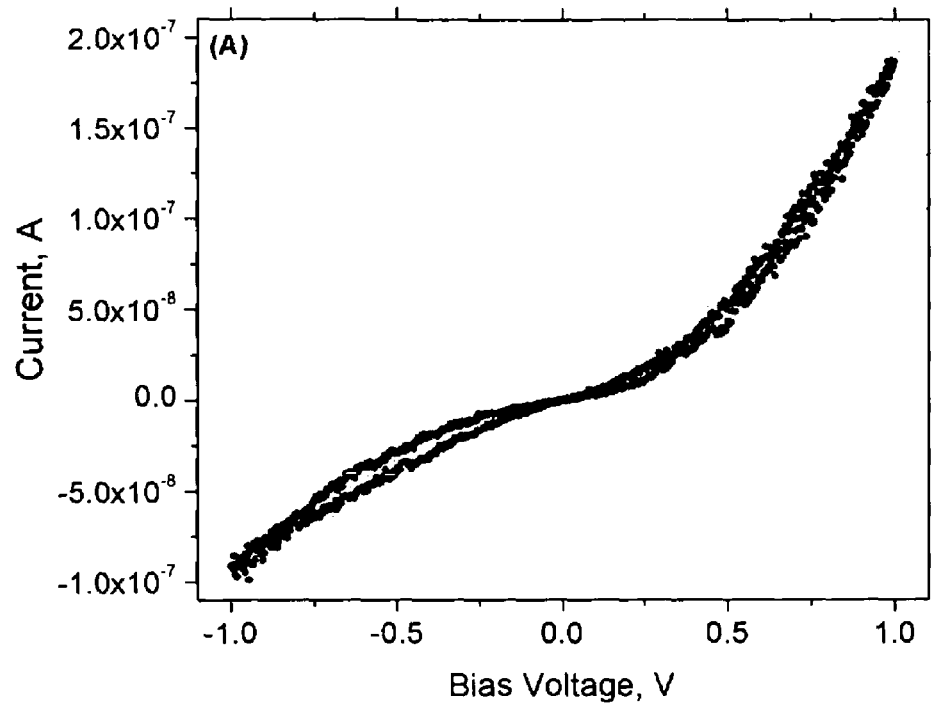
FIGS. 1A and 1B show the dependence of the current as function of the bias voltage applied to CNT-silica composites.

The invention is directed to a novel composite that comprises highly dispersed single walled carbon nanotubes in an inorganic matrix. Because of the highly dispersed nature of the CNTs, these composites are electrically conductive at low levels of CNTs. Such composites can be fabricated in a variety of shaped articles, such as rods, or in the form of thin films on substrates. These composites are useful in various electronic devices, especially nano-sized devices, such as but not limited to chemical or biological sensor, molecular transistor, optoelectronic device, field-emission transistor, artificial actuators, or single-electron device.

The following definitions and abbreviations are to be used for the interpretation of the claims and the specification.

"CNT" means carbon nanotube
"DNA" means deoxyribonucleic acid
"MWNT" means multi-walled nanotube
"PNA" means peptide nucleic acid
"RNA" means ribonucleic acid
"SWNT" means single walled nanotube.

The term "carbon nanotube" refers to a hollow article composed primarily of carbon atoms. The carbon nanotube can be doped with other elements, e.g., metals. The nanotubes typically have a narrow dimension (diameter) of about 1-200 nm and a long length, where the ratio of the long dimension to the narrow dimension, i.e., the aspect ratio, is at least 10. In general, the aspect ratio is between 10 and 100000.

As used herein, a "nucleic acid molecule" is defined as a polymer of RNA, DNA, or peptide nucleic acid (PNA) that is single- or double-stranded, optionally containing synthetic, non-natural or altered nucleotide bases. A nucleic acid molecule in the form of a polymer of DNA may be comprised of one or more segments of cDNA, genomic DNA or synthetic DNA.

The letters "A", "G", "T", "C" when referred to in the context of nucleic acids will mean the purine bases adenine ($C_5H_5N_5$) and guanine ($C_5H_5N_5O$) and the pyrimidine bases thymine ($C_5H_6N_2O_2$) and cytosine ($C_4H_5N_3O$), respectively.

The term "peptide nucleic acids" refers to a material having stretches of nucleic acid polymers linked together by peptide linkers.

The term "highly dispersed" means that the population of CNTs is substantially completely dispersed. Each nanotube fiber is substantially separated from each other and is not part of a "bundle". They are separate entities and are free of strong interaction from each other. The nanotubes are also substantially uniformly distributed throughout the substrate. Dispersion can be shown by absorption measurements, as described in U.S. Pub. Appl. No. 20040132072 and by Bachilo, S., et al., Science, Vol. 298, 2002, pg. 2361.

The term "dispersant" means a compound that can function as a dispersant or surfactant, and typically contains both hydrophobic and hydrophilic regions. The dispersant can be neutral, anionic or cationic, and can be a single compound or polymeric.

The term "associated with a dispersant" when used in the context of a dispersant associated with a carbon nanotube means that the dispersant is in physical contact with the nanotube. The nanotube surface should be substantially covered by the dispersant. The dispersant can be associated in a periodic manner with the nanotube. By "periodic" it is meant that the dispersant is associated with the nanotube at approximately regular intervals. Typical dispersants of the invention are polymers and bio-polymers such as DNA, which are wrapped around the carbon nanotube and associated via hydrogen bonding effects.

The term "nanotube-nucleic acid complex" means a composition comprising a carbon nanotube loosely associated with at least one nucleic acid molecule. Typically the association between the nucleic acid and the nanotube is by van der Waals bonds or some other non-covalent means.

Carbon Nanotubes

Carbon nanotubes of the invention are generally about 0.5-2 nm in diameter where the ratio of the length dimension to the diameter, i.e., the aspect ratio, is at least 10. In general, the aspect ratio is between 10 and 100,000. Carbon nanotubes are comprised primarily of carbon atoms, however, they may be doped with other elements, e.g., metals. The carbon-based nanotubes of the invention are single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube. CNT's have a variety of conductive properties but are typically classified as metallic or semiconducting depending on their relative conductance. For a review of the electronic properties of CNT's see Avouris et al., *Applied Physics of Carbon Nanotubes* (2005), 227-251. Editor(s): Rotkin, Slava V.; Subramoney, Shekhar. Publisher: Springer GmbH, Berlin, Germany.

Carbon nanotubes (CNT) may be produced by a variety of methods, and additionally are commercially available. Methods of CNT synthesis include laser vaporization of graphite target (A. Thess et al. Science 273, 483 (1996)), arc discharge (C. Journet et al., Nature 388, 756 (1997)) and HiPCo (high pressure carbon monoxide) process (P. Nikolaev et al. Chem. Phys. Lett. 313, 91-97 (1999)). Chemical vapor deposition (CVD) can also be used in producing carbon nanotubes (J. Kong et al. Chem. Phys. Lett. 292, 567-574 (1998). Additionally CNTs may be grown via catalytic processes both in solution and on solid substrates (Yan Li, et al., Chem. Mater.; 2001; 13(3); 1008-1014); (N. Franklin and H. Dai Adv. Mater. 12, 890 (2000); A. Cassell et al. J. Am. Chem. Soc. 121, 7975-7976 (1999)).

Dispersants

Dispersants are well-known in the art and a general description can be found in "Disperse Systems and Dispersants", Rudolf Heusch, Ullmann's Encyclopedia of Industrial Chemistry, DOI: 10.1002/14356007.a08_577. The invention provides carbon nanotubes that are highly dispersed, preferably singly dispersed. A number of dispersants may be used for this purpose wherein the dispersant is associated with the carbon nanotube by non-covalent means. The dispersant should preferably substantially cover the length of the nanotube, preferably at least half of the length of the nanotube, more preferably substantially all of the length. The dispersant can be associated in a periodic manner with the nanotube, such as wrapping. Preferred dispersants of the invention are polymers. In one embodiment synthetic polymers may be suitable as dispersants where they are of suitable length to sufficiently disperse the nanotubes. Examples of polymers that could be suitable for the present invention include but are not limited to those described in M. O'Connell et al., *Chem. Phys. Lett.*, 342, 265, 2001 and WO 02/076888. Preferred polymer dispersants for use in the present invention include, but are not limited to polyamines, nonionic polymers, anionic polymers, and cationic polymers.

The solvent used for the nanotube dispersion can be any solvent that will dissolve the dispersant. The choice of solvent is not critical provided the solvent is not detrimental to the nanotubes or dispersant, and may be a mixture. Preferably the solution is water or aqueous based, optionally containing buffers, salts, and/or chelators.

In a preferred embodiment the dispersant will be a bio-polymer. Bio-polymers particularly suited for the invention include those described in U.S. Patent Appl. No. 20040132072, herein incorporated in entirely by reference. Bio-polymers particularly useful as dispersants in the present invention include, but are not limited to peptides, proteins, nucleic acids and peptide nucleic acids.

Bio-Polymers

Bio-polymers of the invention include those comprised of nucleic acids and polypeptides. Polypeptides may be suitable as dispersants in the present invention if they have suitable length to sufficiently disperse the nanotubes. Bio-polymers particularly well suited for singly dispersing carbon nanotubes are those comprising nucleic acid molecules. Nucleic acid molecules of the invention may be of any type and from any suitable source and include but are not limited to DNA, RNA and peptide nucleic acids. The nucleic acid molecules may be either single stranded or double stranded and may optionally be functionalized at any point with a variety of reactive groups, ligands or agents. The nucleic acid molecules of the invention may be generated by synthetic means or may be isolated from nature by protocols well known in the art (Sambrook, J., Fritsch, E. F. and Maniatis, T., Molecular Cloning: A Laboratory Manual, Cold Spring Harbor Laboratory Press, Cold Spring Harbor, N.Y., 1989).

It should be noted that functionalization of the nucleic acids is not necessary for their association with CNTs for the purpose of dispersion. Functionalization may be of interest after the CNTs have been dispersed and it is desired to bind other moieties to the nucleic acid or immobilize the carbon nanotube-nucleic acid complex to a surface through various functionalized elements of the nucleic acid. As used herein nucleic acids that are used for dispersion typically lack functional groups and are referred to herein as "unfunctionalized".

Peptide nucleic acids (PNA) are particularly useful in the present invention, as they possess the double functionality of both nucleic acids and peptides. Methods for the synthesis and use of PNA's are well known in the art, see for example Antsypovitch, S. I. *Peptide nucleic acids: structure* Russian Chemical Reviews (2002), 71(1), 71-83.

The nucleic acid molecules of the invention may have any composition of bases and may even consist of stretches of the same base (poly A or poly T for example) without impairing the ability of the nucleic acid molecule to disperse the bundled nanotube. Preferably the nucleic acid molecules will be less than about 2000 bases where less than 1000 bases is preferred and where from about 5 bases to about 1000 bases is most preferred. Generally the ability of nucleic acids to disperse carbon nanotubes appears to be independent of sequence or base composition, however there is some evidence to suggest that the less G-C and T-A base-pairing interactions in a sequence, the higher the dispersion efficiency, and that RNA and varieties thereof are particularly effective in dispersion and are thus preferred herein. Nucleic acid molecules suitable for use in the present invention include but are not limited to those having the general formula:

1. An wherein n=1-2000;
2. Tn wherein n=1-2000;
3. Cn wherein n=1-2000;
4. Gn wherein n=1-2000;
5. Rn wherein n=1-2000, and wherein each R may be either A or G;
6. Yn wherein n=1-2000, and wherein each Y may be either C or T;
7. Mn wherein n=1-2000, and wherein each M may be either A or C;
8. Kn wherein n=1-2000, and wherein each K may be either G or T;
9. Sn wherein n=1-2000, and wherein each S may be either C or G;
10. Wn wherein n=1-2000, and wherein each W may be either A or T;
11. Hn wherein n=1-2000, and wherein each H may be either A or C or T;
12. Bn wherein n=1-2000, and wherein each B may be either C or G or T;
13. Vn wherein n=1-2000, and wherein each V may be either A or C or G;
14. Dn wherein n=1-2000, and wherein each D may be either A or G or T; and
15. Nn wherein n=1-2000, and wherein each N may be either A or C or T or G;

In addition to the combinations listed above a person of skill in the art will recognize that any of these sequences may have one or more deoxyribonucleotides replaced by ribonucleotides (i.e., RNA or RNA/DNA hybrid) or one or more sugar-phosphate linkages replaced by peptide bonds (i.e. PNA or PNA/RNA/DNA hybrid).

Once the nucleic acid molecule has been prepared, it may be stabilized in a suitable solution. It is preferred if the nucleic acid molecules are in a relaxed secondary conformation and only loosely associated with each other to allow for the greatest contact by individual strands with the carbon nanotubes. Stabilized solutions of nucleic acids are common and well known in the art (see Sambrook supra) and typically include salts and buffers such as sodium and potassium salts, and TRIS (Tris(2-aminoethyl)amine), HEPES (N-(2-hydroxyethyl)piperazine-N'-(2-ethanesulfonic acid), and MES(2-(N-Morpholino)ethanesulfonic acid. Preferred solvents for stabilized nucleic acid solutions are those that are water miscible where water is most preferred.

Once the nucleic acid molecules are stabilized in a suitable solution they may be contacted with a population of bundled carbon nanotubes. It is preferred, although not necessary if the contacting is done in the presence of an agitation means of some sort. Typically the agitation means employs sonication for example, however may also include, devices that produce high shear mixing of the nucleic acids and nanotubes (i.e. homogenization), or any combination thereof. Upon agitation the carbon nanotubes will become dispersed and will form nanotube-nucleic acid complexes comprising at least one nucleic acid molecule loosely associated with the carbon nanotube by hydrogen bonding or some non-covalent means.

The process of agitation and dispersion may be improved with the optional addition of nucleic acid denaturing substances to the solution. Common denaturants include but are not limited to formamide, urea and guanidine. A non-limiting list of suitable denaturants may be found in Sambrook supra.

Additionally, temperature during the contacting process will have an effect on the efficacy of the dispersion. Agitation at room temperature or higher has been seen to give longer dispersion times whereas agitation at temperatures below room temperature (23° C.) have been seen to give more rapid dispersion times where temperatures of about 4° C. are preferred.

Recovery of Dispersed Nanotubes

Once the nanotube-nucleic acid molecule complexes are formed they must be separated from solution as well as purified from any metallic particles, which may interfere in the dispersion by the charged dispersant. Where the nucleic acid has been functionalized by the addition of a binding pair for example separation could be accomplished by means of immobilization though the binding pair. However, where the nucleic acid has not been functionalized an alternate means for separation must be found. Gel electrophoresis chromatography or phase separation provide a rapid and facile method for the separation of nanotube-nucleic acid complexes into discreet fractions based on size or charge. These methods have been applied to the separation and recovery of coated nanoparticles (as described in U.S. Patent Appl. No. 20040115345, incorporated herein by reference) and have been found useful here. U.S. Ser. No. 10/716,347 (WO2004/048256), incorporated herein by reference, describes methods for the separation and recovery of nanotube-nucleic acid complexes. Alternatively, the complexes may be separated by two phase separation methods. In this method, nanotube-nucleic acid complexes in solution are fractionated by adding a substantially water-miscible organic solvent in the presence of an electrolyte. The amount of the substantially water-miscible organic solvent added depends on the average particle size desired. The appropriate amount can be determined by routine experimentation. Typically, the substantially water-miscible organic solvent is added to give a concentration of about 5% to 10% by volume to precipitate out the largest particles. The complexes are collected by centrifugation or filtration. Centrifugation is typically done using a centrifuge, such as a Sorvall® RT7 PLUS centrifuge available from Kendro Laboratory Products (Newtown, Conn.), for about 1 min at about 4,000 rpm. For filtration, a porous membrane with a pore size small enough to collect the complex size of interest can be used. Optionally, sequential additions of the substantially water-miscible organic solvent are made to the complex solution to increase the solvent content of the solution and therefore, precipitate out complexes of smaller sizes.

After separation by any one of the above methods it may be necessary to additionally filter the CNTs to remove any metallic particles, which may interfere with the dispersion or alignment of the CNTs Matrix Preparation The inorganic matrix of the present invention may be any solid material in which the CNTs can be dispersed. Preferred matrix materials are metal oxides, such as but not limited to silica, titania, alumina, vanadium oxide, zirconium oxide, tungsten oxide and mixed metal oxides such as aluminosilicates. Metal oxides, for purposes of this invention, can have more than one type of metal present in the matrix, such as aluminosilicates, and can also include organically modified metal oxides such as alkyl silicates. The matrix may be prepared using sol-gel techniques. A "sol-gel technique" is a process wherein a free flowing fluid solution, "sol", is first prepared by dissolving suitable precursor materials such as colloids, alkoxides or metal salts in a solvent. The "sol" is then dosed with a reagent to initiate reactive polymerization of the precursor. In a typical example tetraethoxyorthosilicate (TEOS) is dissolved in ethanol. Water, with trace acid or base as catalyst to initiate hydrolysis, is added. As polymerization and crosslinking proceeds, the free flowing "sol" increases in viscosity and can eventually set to a rigid "gel" network. The "gel" network consists of a crosslinked or polymerized network of the desired material that encapsulates the original solvent within its open porous structure. The "gel" network may then be dried, typically by either simple heating in a flow of dry air to produce a xerogel or the entrapped solvent may be removed by displacement with a supercritical fluid such as liquid $CO_2$ to produce an aerogel. The dried gel network, aerogels and xerogels, may be optionally calcined at elevated temperatures (>200° C.) that results in products, which typically have very porous structures and concomitantly high surface areas.

The invention is also directed to a method for the production of a single walled carbon nanotube containing composition comprising the steps of: a) providing a population of highly dispersed single walled carbon nanotubes in solution; b) mixing the solution of a) with a metal oxide precursor system to form a reaction mixture; c) allowing the reaction mixture of b) to form a metal oxide network; d) removing any residual solvent from the metal oxide network to form a dried metal oxide network; and e) optionally washing the dried metal oxide network.

Preferably the single walled carbon nanotubes are associated with a dispersant, as described above.

The term "metal oxide precursor" refers to the form of the metal oxide, which is originally added in the sol-gel process to finally yield a metal oxide in the final material. In the case of silica, for example, it is well known that a range of silicon alkoxides can be hydrolyzed and condensed to form a silica network. Such precursors as tetramethoxysilane (tetramethyl orthosilicate), tetraethoxysilane (tetraethyl orthosilicate), tetrapropoxysilane, tetrabutoxysilane, and any compounds under the class of metal alkoxides which in the case of silicon is represented by $Si(OR)_4$, where R includes methyl, ethyl, n-propyl, iso-propyl, n-butyl, sec-butyl, iso-butyl, tert-butyl or where R is a range of organic groups, such as alkyl. Also included as a precursor form is silicon tetrachloride. Further precursor forms comprise organically modified alkoxides, for example, $CH_3Si(OCH_3)_3$, $PhSi(OCH_3)_3$, and $(CH_3)_2Si(OCH_3)_2$. These organically modified metal oxides will form modified metal oxides after the sol-gel process is completed. A description of these can be found in Sanchez, C., et al., C. R. Chimie 6 (2003), 1131-1151, and Schottner, G., Chem. Mater., 2001, 13, 3422-3435. Other network formers include metal silicates, for example, potassium silicate, sodium silicate, lithium silicate. The analog of the compounds illustrated above can be used as precursors for other metal oxides, such as but not limited to Al, V, Zr, W, and Ti, to form a polymer network based on vanadia, titania, zirconia, tungten oxide, and alumina.

The metal oxide precursor system includes a solvent. This solvent should be miscible with the solution containing the carbon nanotubes, such as but not limited to water and various lower aliphatic alcohols such as methanol, 1-propanol, 2-propanol, mixed ethers and n-butanol.

The precursor system may be partially or totally hydrolyzed before being mixed with the CNT solution of a), as long as little or no gelation or polymerization of the precursor system has occurred.

The gel forming condensation reaction can be carried out at virtually any temperature at which the solvent is in liquid form, typically at room temperature. The time needed for this step can vary widely depending on factors such as acidity, temperature, and concentration. It can vary from practically instantaneous to several days.

Pressure over the gel forming condensation reaction is not critical and may vary widely. Typically, the reaction is carried out at atmospheric pressure. The gel forming condensation reaction can be carried out over a wide range of acidity and basicity depending upon the amount of base added to the gel precursor.

After formation, the product, still in the presence of its reaction solvent, may be allowed to stand for a period of time. This is referred to as aging.

Next, any residual solvent is removed, allowing the product to form a solid. The product can be dried at room temperature or at elevated temperatures in an oven for a time sufficient to remove solvent. Drying can be done under vacuum, or in air or using an inert gas such as nitrogen.

The single walled carbon nanotube composition described herein has the unique property that it is conductive at low CNT loadings. A preferred composition has a conductivity of about 1 nanoampere/volt to about 10 millampere/volt. The composition can be conductive at concentrations of carbon nanotubes at about 0.1 to about 2 weight %.

The compositions of the instant invention can preferably contain carbon nanotubes that are substantially metallic, substantially semiconducting, or have substantially uniform of chirality. These compositions can be particularly useful in many applications, such as the devices listed below. The carbon nanotubes can be separated by any means known in the art. One method of separating metallic from semi-conducting SWNTs in a suspension using alternating current dielectrophoresis is reported by Krupke, et al, Science, 301, 344-347 (2003). Methods used to separate CNTs dispersed with DNA or another biopolymer are described above and in U.S. Ser. No. 10/716,347 (WO2004/048256), incorporated herein by reference.

The invention is also directed to a coated article comprising a substrate on which any of the CNT compositions described above are coated thereon. Any rigid or flexible substrate can be used with any coating method known in the art. One particularly useful coating method is a patterning method. Patterning methods are well-known in the art; see, for instance, Kirk-Othmer Encyclopedia of Chemical Technology. John Wiley & Sons, Inc., *Patterning*, DOI: 10.1002/0471238961.0914200519012303.a01, 2003. Particularly useful methods include but are not limited to phase shift lithography, conventional photolithography, optical lithography, and topographically directed etching, printing, molding, and embossing. For a review of methods for fabricating and patterning nano-structures see for example Xia et al., *Chem. Rev. American Chemical Society,* Vol 99, 1823-1848, 1999.

The compositions of the present invention are particularly useful in devices, especially nanodevices, such as but not limited to field effect transistors (FET), FET based sensors, biosensors, carbon nanotube-based thin-film transistors, carbon nanotube-based optical devices, carbon nanotube-based magnetic devices, field-emission display devices, molecular transistors, and other optoelectronic devices, electrochemical devices, and single-electron devices.

General Methods:

Nucleic acids used in the following examples were obtained using standard recombinant DNA and molecular cloning techniques as described by Sambrook, supra, by T. J. Silhavy, M. L. Bennan, and L. W. Enquist, *Experiments with Gene Fusions,* Cold Spring Harbor Laboratory, Cold Spring Harbor, N.Y., 1984, and by Ausubel, F. M. et al., *Current Protocols in Molecular Biology,* Greene Publishing Assoc. and Wiley-Interscience, N.Y., 1987.

The meaning of abbreviations used is as follows: "min" means minute(s), "h" means hour(s), "µL" means microliter(s), "mL" means milliliter(s), "L" means liter(s), "nm" means nanometer(s), "mm" means millimeter(s), "cm" means centimeter(s), "µm" means micrometer(s), "mM" means millimolar, "M" means molar, "mmol" means millimole(s), "µmole" means micromole(s), "g" means gram(s), "µg" means microgram(s), "mg" means milligram(s).

EXAMPLES

Example 1

HiPCO carbon nanotubes (CNI, Houston, Tex.) were suspended at 0.25 mg/mL in 200 mL of a 1% solution of poly (ethyleneoxide-propylene oxide) (3:1) (Polysciences Inc., Warrington, Pa.) in water. The suspension was then homogenized for 0.5 h using a high shear homogenizer (Polyscience X-360). The suspension was then sonicated in a cup-horn sonicator for 20 min at a power of 540 W. The suspension was then distributed into 6 centrifuge tubes and spun for 4 h at 28,000 rpm in a swinging bucket rotor (Beckman SW-28). The supernatant was collected and concentrated in an Amicon ultrafiltration cell using a YM-100 membrane (Millipore) down to a volume of 15-30 mL.

1 g of the carbon nanotubes was then purified by heating the tubes in air for 20 hours. The tubes were then treated by sonicating with 100 ml of concentrated hydrochloric acid in a bath for 30 minutes. The carbon nanotubes were collected by filtration and washed with distilled water, then ethanol, followed by air drying for one day. Next, 0.2 g of the cleaned SWCNT were added to 40 ml of water, which also contained 1 wt % dodecylbenzenesulfonic acid. The mixture was sonicated and stirred for a total of 2 hours. 10 g of the carbon nanotube solution were then placed in a centrifuge and centrifuged at 5000 rpm for 2 hours. The solution was decanted from a small plug at the bottom. The dry weight of the plug was 25 mg, indicating the concentration of the suspended tubes was at least 25 mg in 10 grams of solution (from the 0.5 wt % solution). This was the stock solution used in the following synthesis. 3.8 g of tetramethoxysilane was added to 4.5 g of water followed by 66 mg of 0.04 M HCl, causing hydrolysis of the tetramethoxysilane. The solution was stirred for 2 hours. One gram of the centrifuged carbon nanotube solution was then added to 2 g of water (with stirring) followed by 1 g of the hydrolyzed silica solution. Next, 0.2 g of a 50 mM phosphate buffer solution was added (pH 7) and the vial was placed in an oven at 70° C. The solution gelled in a few minutes. The top was removed from the vial and the gelled material was left overnight at 70° C. The temperature was increased to 90° C. for another day to dry the gel. The dried gel was then washed with excess water and then re-dried before testing. A black, hard glass like composite material resulted.

Example 2

1 ml of a GT20 DNA dispersion of carbon nanotubes (prepared as described in U.S. Pub. Appl. 20040132072) which contained about 0.3 mg CNTs per ml, was added to 0.89 g of a hydrolyzed tetramethoxy silane solution as described in Example 1 (3.8 g of tetramethoxysilane were added to 4.5 g of water followed by 66 mg of 0.04 M HCl). The solution was placed in a tube (ca. 3 mm in diameter and 15 cm long) and placed in an oven at 70° C. overnight. The solution gelled in a few minutes. The top was removed from the tube after 2 hours and the gelled material was left overnight at 70° C. The temperature was increased to 90° C. for two days to dry the gel. The dried gel was then washed with excess water and then re-dried before testing. A black, hard glass like composite material resulted containing 0.85% weight of CNTs.

The example was repeated as described above except with 0.25 g of the hydrolyzed tetramethoxy silane solution, to produce a black, hard glass like composite material containing 0.24% weight of CNTs.

Figure 1B:
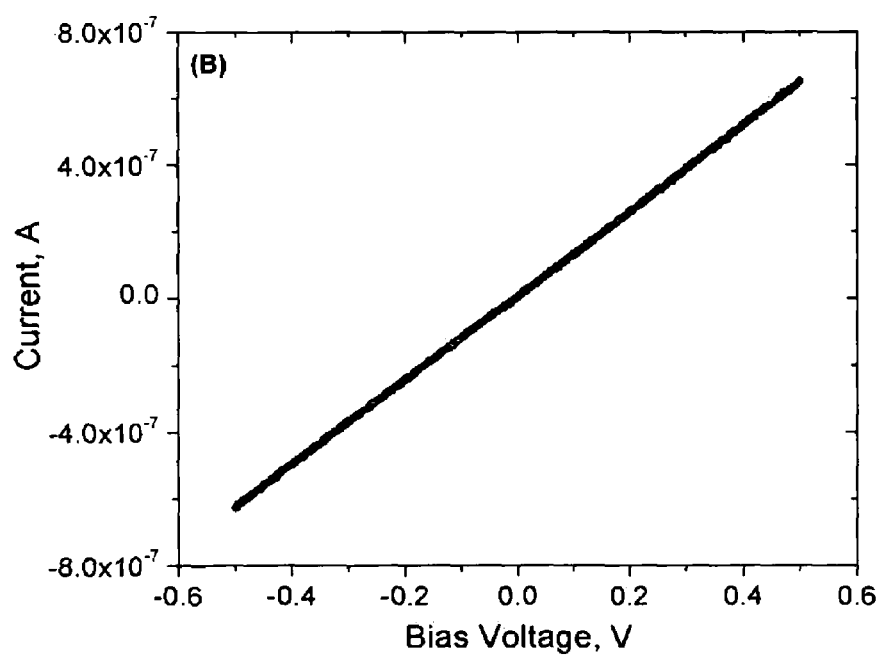

The electronic properties of the single walled carbon nanotube silica composites were then measured with a Carl Suss probe station system (SUSS MicroTec, Waterbury, Vt.). Samples in the form of grains were placed on the sample holder of the probe station. Then, two probes were brought into contact with the composite material. As the bias voltage across the probes was varied, the current flowing through the composite material was monitored with an Keithley electrometer. FIGS. 1A and 1B shows the dependence of the current as function of the bias voltage applied to the probes. The plots indicate that the conductivity of the composite materials, which originate from the particular electronic properties of the single walled carbon nanotubes, varies with the % weight of CNT in the matrix. FIG. 1A shows the linear dependence of the current as function of the bias voltage for the composite loaded with 0.85% weight of CNT. However, at 0.24% weight, as shown in 1B, the dependence of the current is non-linear due to the decrease of CNT within the conducting path.

Example 3

Carbon nanotubes (SouthWest NanoTechnologies, Inc., Norman, Okla.) were suspended at 0.25 mg/mL in 200 mL of a 1% solution of Triton™ X-405 (Aldrich) in water. The suspension was then homogenized for 0.5 h using a high shear homogenizer (Polyscience X-360). The suspension was then sonicated in a cup-horn sonicator for 20 min at a power of 540 W. The suspension was then distributed into 6 centrifuge tubes and spun for 4 h at 28,000 rpm in a swinging bucket rotor (Beckman SW-28). The supernatant was collected and concentrated in an Amicon ultrafiltration cell using a YM-100 membrane (Millipore) down to a volume of 15-30 mL.

Figure 2A:
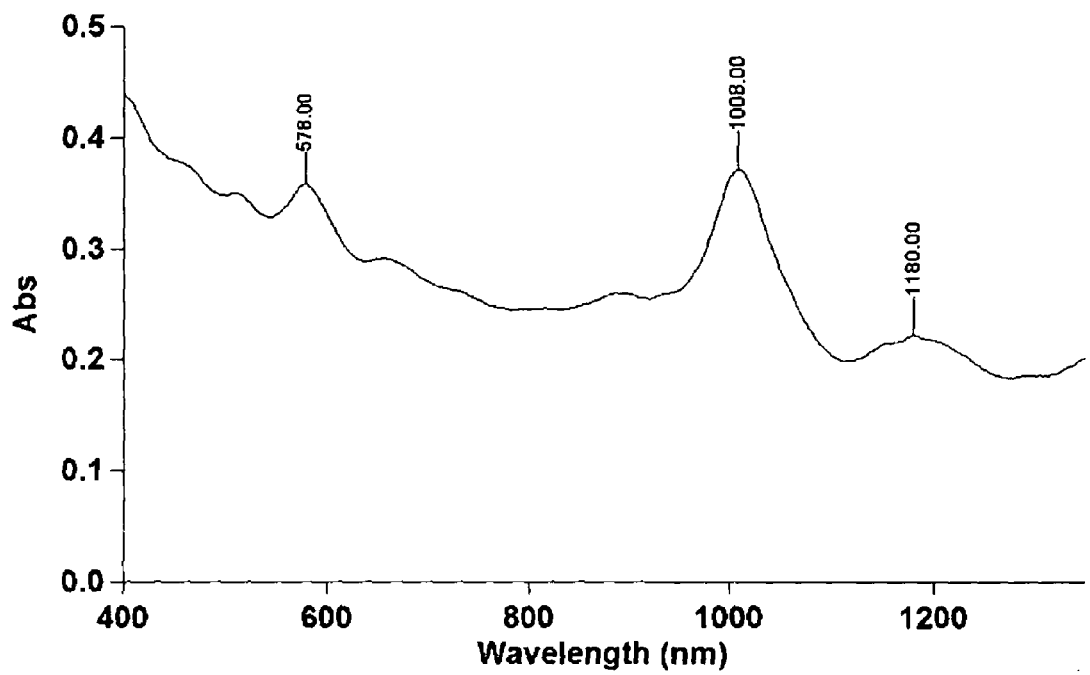
FIGS. 2A and 2B are absorption spectra of a solution and thin-film of a DNA-dispersed CNT silica composite as solution and as a thin-film from Example 3.
Figure 2B:
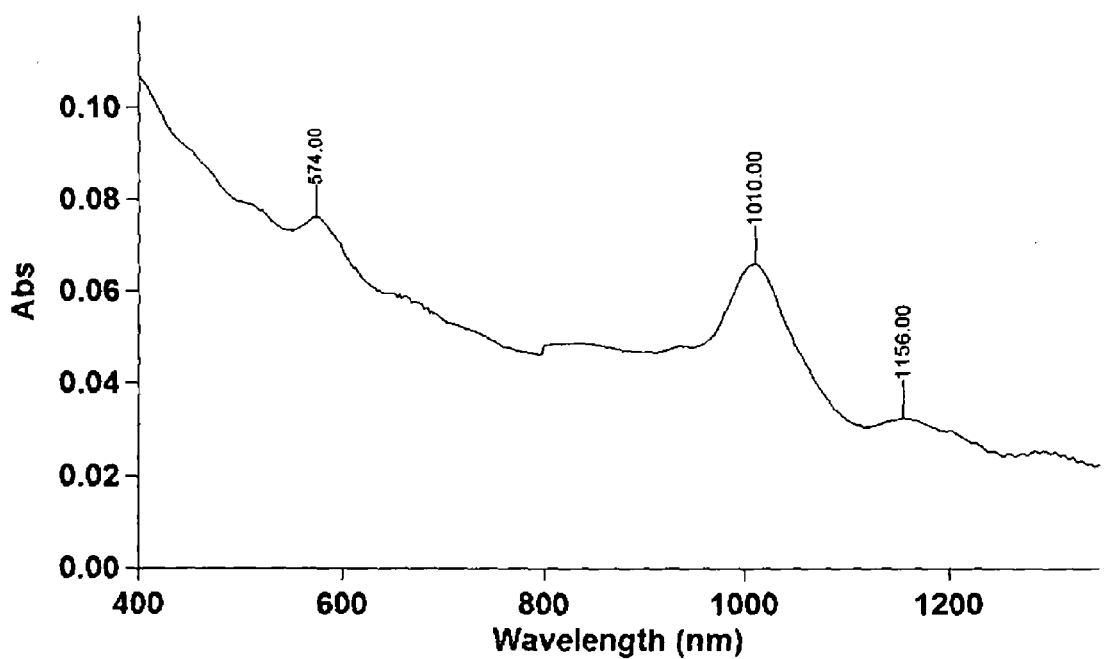

5 ml of the carbon nanotubes which contained about 0.06 mg per ml, were then added to 10 microliters of the hydrolyzed tetramethoxy silane solution, as described in Example 1. (3.8 g of tetramethoxysilane was added to 4.5 g of water followed by 66 mg of 0.04 M HCl, left for 4 hours). 5 microliters of the above brown colored solution was spread out on a glass cover slide (1.3×1.3 cm$^2$) and left to dry in air. A thin film resulted. The thin film and the coating solution were both analyzed via absorbance in the 400-1200 nm range, shown in FIGS. 2A and 2B. The absorbance was consistent with a highly dispersed form of the nanotubes within the silica matrix and shows that the nanotubes are still highly dispersed after being dried and formed into a film.

Example 4

Figure 3A:
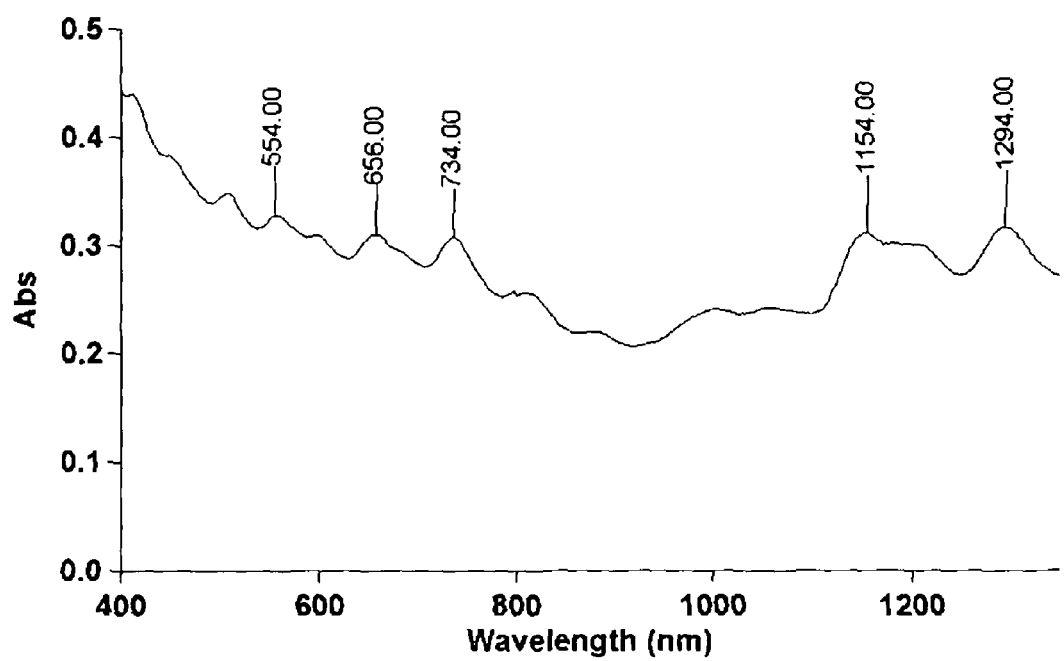
FIGS. 3A and 3B are absorption spectra of a solution and thin-film of a polymer-dispersed CNT silica composite as solution and as a thin-film from Example 4.
Figure 3B:
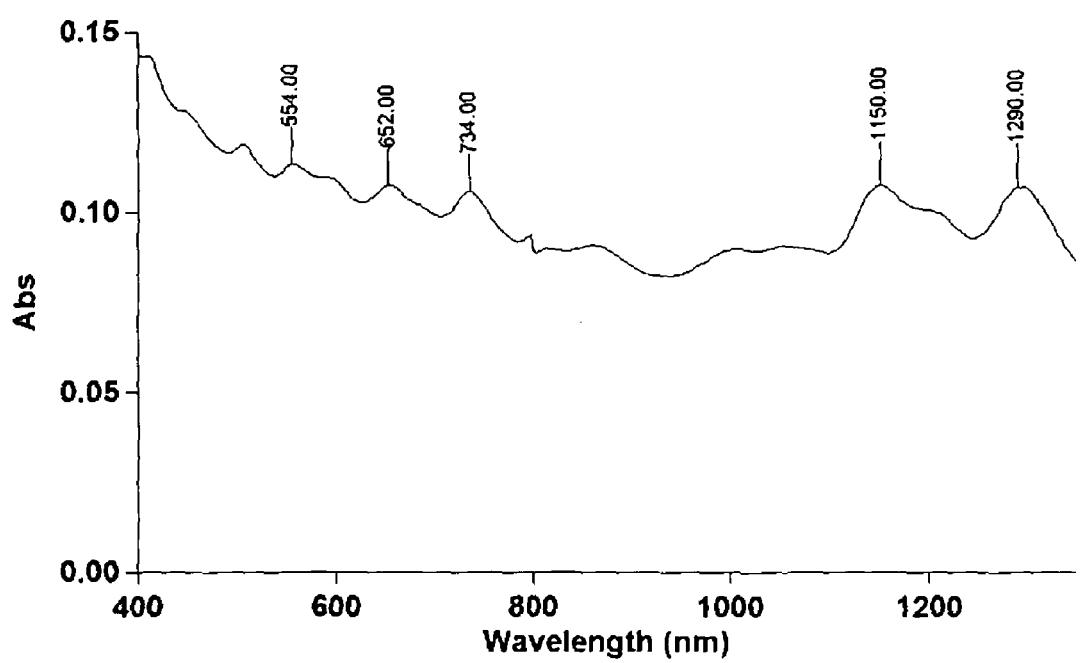

5 ml of a polyoxyethylenepolypropylene co-polymer dispersion of HiPCO (CNI) carbon nanotubes (which contained about 0.06 mg per ml, was added to 10 microliters of the hydrolyzed tetramethoxy silane solution as described in Example 1. (3.8 g of tetramethoxysilnae was added to 4.5 g of water followed by 66 mg of 0.04 M HCl, left for 4 hours). 5 microliters of the above brown colored solution was spread out on a glass cover slide (1.3×1.3 cm$^2$) and left to dry in air. A thin film resulted. The thin film and the coating solution were both analyzed via absorbance in the 400-1200 nm range, shown in FIGS. 3A and 3B. The absorbance was consistent with a highly dispersed form of the nanotubes within the silica matrix and shows that the nanotubes are still highly dispersed after being dried and formed into a film.

Example 5

0.2 ml of a GT20 DNA dispersion of carbon nanotubes, which contained about 0.3 mg CNTs per ml, was added to 50 microliters of a hydrolyzed tetramethoxy silane solution prepared as described in Example 1. (3.8 g of tetramethoxysilnae was added to 4.5 g of water followed by 66 mg of 0.04 M HCl, left for 4 hours). The solution was then spun coated onto a 1 in. diameter silicon wafer. The silicon wafer had been cleaned in an UV-ozone plasma for 5 minutes to ensure wettability of the surface. The solution was applied to the surface using a dropper and the wafer was spun at 1000 rpm for 2 minutes. The coated wafer was examined using a scanning electron microscope (Hitachi 2100) and was shown to have a uniform coating of about 100 nm in thickness.

What is claimed is:

1. A single walled carbon nanotube composition comprising a population of highly dispersed single walled carbon nanotubes in an inorganic matrix, wherein said single walled carbon nanotubes are associated with a nucleic acid dispersant.

2. The single walled carbon nanotube composition according to claim 1 wherein the inorganic matrix is a metal oxide.

3. The single walled carbon nanotube composition according to claim 1 wherein the nucleic acid dispersant is selected from the group consisting of DNA, RNA, and peptide nucleic acids.

4. The single walled carbon nanotube composition according to claim 1 wherein the matrix comprises silica, titania, alumina, vanadium oxide, aluminosilicate, tungsten oxide, and zirconium oxide.

5. The single walled carbon nanotube composition according to claim 2 wherein the matrix is prepared using sol-gel methods.

6. The single walled carbon nanotube composition according to claim 1 wherein when the composition has a conductivity of about 1 nanoampere/volt to about 10 milliampere/volt.

7. The single walled carbon nanotube composition according to claim 6 wherein the composition contains about 0.1 to about 2 weight % of carbon nanotubes.

8. The single walled carbon nanotube composition according to claim 1 wherein the carbon nanotubes are substantially metallic.

9. The single walled carbon nanotube composition according to claim 1 wherein the carbon nanotubes are substantially semiconducting.

10. The single walled carbon nanotube composition according to claim 1 wherein the carbon nanotubes have substantially uniform chirality.

11. A coated article comprising a substrate comprising the composition of claim 1 coated on said substrate.

12. The coated article according to claim 11 wherein the composition is coated on the substrate using a patterning method.

13. The coated article according to claim 12 wherein the patterning method is selected from the group consisting of phase shift lithography, conventional photolithography, optical lithography, and topographically directed etching, printing, molding, and embossing.

14. A shaped article comprising the composition according to claim 1.

15. The shaped article according to claim 14 that is rod-shaped.

16. The coated article according to claim 12 wherein the substrate is flexible.

17. A device comprising the single walled carbon nanotube containing composition of claim 1.

18. The device according to claim 17 that is a chemical or biological sensor, molecular transistor, optoelectronic device, field-emission transistor, artificial actuator, thin-film transistor, field effect transistor, field effect transistors based sensor, electrochemical device, or single-electron device.

* * * * *